(No Model.)

B. C. FOSTER.
FLEXIBLE TIRE FOR WHEELS.

No. 458,547. Patented Aug. 25, 1891.

WITNESSES:
INVENTOR:
ATTORNEYS

UNITED STATES PATENT OFFICE.

BENJAMIN C. FOSTER, OF NEW YORK, N. Y., ASSIGNOR TO NEIL CAMPBELL, OF SAME PLACE.

FLEXIBLE TIRE FOR WHEELS.

SPECIFICATION forming part of Letters Patent No. 458,547, dated August 25, 1891.

Application filed October 7, 1890. Serial No. 367,302. (No model.)

*To all whom it may concern:*

Be it known that I, BENJAMIN C. FOSTER, of the city, county, and State of New York, have invented a new and Improved Flexible Tire for Wheels, of which the following is a full, clear, and exact description.

The object of the invention is to provide a new and improved flexible tire designed for use on wheels of bicycles, carriages, and other vehicles, and which has a superior elasticity because of being completely cushioned throughout.

The invention consists of a tire having an internal spider-like web forming a series of compartments separated one from the other.

The invention also consists of certain parts and details and combinations of the same, as will be fully described hereinafter, and then pointed out in the claim.

Reference is to be had to the accompanying drawings, forming a part of this specification, in which similar letters of reference indicate corresponding parts in both figures.

Figure 1:
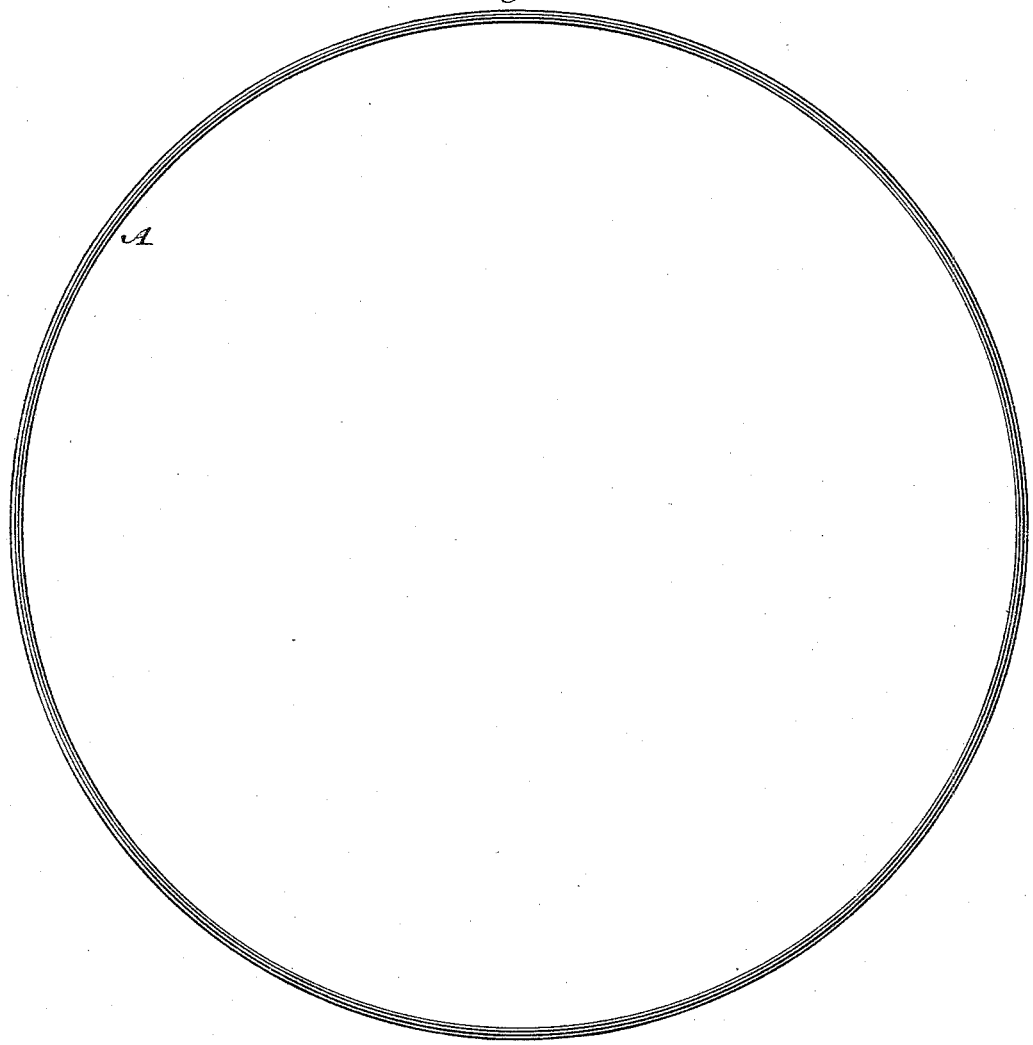
Figure 2:
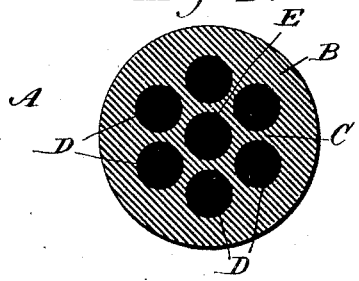

Figure 1 is a side elevation of the improvement, and Fig. 2 is an enlarged transverse section of the same.

The improved tire A is preferably made of a flexible material, such as rubber, and formed circular in cross-section. The tire A is provided with a circular rim B and a spider-like web C, forming between its spokes a series of compartments D, separated one from the other by the spokes. The spider-like web C is made continuous throughout the length of the tire, so that the compartments are likewise formed continuous with the central hub-opening E of the spider-like web C. The rim B of the tire and the spider-like web are formed of the same material, being integral with one another. A tire formed in this manner is completely cushioned throughout, and at the same time its weight is considerably reduced. If desired, the compartments D may be charged with a fluid under pressure. It will be seen that when a tire of this construction is used on the wheel of a vehicle if the wheel strikes a sharp stone or other obstruction and cuts the tire then only one compartment is affected by the cut while the others are not touched, and the entire tire remains serviceable.

By this improvement tires of a large diameter and cross-section can be constructed without materially adding any weight. It is understood that the spokes of the spider-like web completely sustain the compression of the rim of the tire and at the same time they permit the compression of the tire in any direction that the pressure may be applied.

I am aware that hollow tires have been constructed either with a concentric opening or with an eccentric opening—such, for instance, as is shown in the Patent No. 315,537, granted to A. H. Overman on the date of April 14, 1885—but such hollow tires usually flatten out when used for a considerable length of time, thus losing much of their elasticity, and if cut by a stone or other obstruction the entire tire flattens out at once.

Having thus described my invention, I claim as new and desire to secure by Letters Patent—

A flexible tire for wheels, comprising a continuous hollow rim circular in cross-section and a continuous spider-like web formed within and integrally with the said hollow rim, the said web comprising a central hub and radial spokes, so as to produce, in connection with the said rim, a series of continuous compartments separated one from the other, substantially as shown and described.

BENJAMIN C. FOSTER.

Witnesses:
   THEO. G. HOSTER,
   EDGAR TATE.